US007958238B1

(12) United States Patent
Batz et al.

(10) Patent No.: US 7,958,238 B1
(45) Date of Patent: Jun. 7, 2011

(54) SYSTEM AND METHOD FOR MANAGING NETWORK ACCESS FOR AN END USER

(75) Inventors: Robert M. Batz, Raleigh, NC (US); Mark Albert, Morrisville, NC (US); Louis F. Menditto, Raleigh, NC (US); Laurent H. Andriantsiferana, Cupertino, CA (US); Pranav K. Tiwari, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1178 days.

(21) Appl. No.: 10/360,086

(22) Filed: Feb. 7, 2003

(51) Int. Cl.
*G06F 15/173* (2006.01)

(52) U.S. Cl. ... 709/225; 709/231; 379/130; 379/114.01; 455/406; 455/432; 455/466

(58) Field of Classification Search .................. 709/225, 709/231; 379/130, 114.01; 455/406, 436, 455/466; 370/331; 705/32
See application file for complete search history.

(56) References Cited

U.S. PATENT DOCUMENTS

| 5,602,907 | A |   | 2/1997  | Hata et al. ..................... 379/114 |
|-----------|---|---|---------|-------------------------------------------|
| 5,822,411 | A |   | 10/1998 | Swale et al. ................... 379/111  |
| 5,828,737 | A |   | 10/1998 | Sawyer ......................... 379/114  |
| 5,873,030 | A | * | 2/1999  | Mechling et al. ............. 455/408     |
| 5,905,736 | A |   | 5/1999  | Ronen et al. .................. 370/546   |
| 5,909,238 | A |   | 6/1999  | Nagashima et al. ............. 348/3      |
| 5,946,670 | A |   | 8/1999  | Motohashi et al. ........... 705/400      |
| 5,956,391 | A |   | 9/1999  | Melen et al. ................... 379/114  |
| 5,970,477 | A | * | 10/1999 | Roden ............................. 705/32 |
| 5,987,498 | A |   | 11/1999 | Athing et al. ................. 709/203   |
| 6,016,509 | A |   | 1/2000  | Dedrick ......................... 709/224 |
| 6,035,281 | A |   | 3/2000  | Crosskey et al. ............... 705/14    |
| 6,047,051 | A | * | 4/2000  | Ginzboorg et al. ........... 379/130      |
| 6,070,192 | A |   | 5/2000  | Holt et al. ..................... 709/227 |
| 6,075,854 | A |   | 6/2000  | Copley et al. ................. 379/211   |
| 6,131,024 | A |   | 10/2000 | Boltz ............................. 455/405 |
| 6,141,684 | A |   | 10/2000 | McDonald et al. ........... 709/222       |
| 6,175,879 | B1 |  | 1/2001  | Shah et al. ..................... 709/330 |

(Continued)

FOREIGN PATENT DOCUMENTS

WO    WO 98/26381    6/1998

(Continued)

OTHER PUBLICATIONS

Online Inc., "Apogee Releases Content Usage-Based Billing Product Annotated Title—Software allows content usage-based billing," EContent, vol. 24, No. 5, NDN 173-0356-6509-7, 1 pg, Jul. 2001.

(Continued)

*Primary Examiner* — Thuong T Nguyen
(74) *Attorney, Agent, or Firm* — Baker Botts L.L.P.

(57) ABSTRACT

A method for managing network access is provided that includes receiving a signal indicating a change in a network parameter, the change reflecting that an end user associated with a communication session has changed from using a first network node to a second network node. Each of the network nodes is operable to facilitate the communication session associated with the end user. The method also includes communicating with a billing system element to notify the billing system element of the change in the network parameter and receiving quota information for the end user associated with the second network node. The billing information associated with the second network node may be applied to the communication session, the billing information being based on the quota information.

22 Claims, 2 Drawing Sheets

U.S. PATENT DOCUMENTS

| | | | |
|---|---|---|---|
| 6,208,977 B1 | 3/2001 | Hernandez et al. | 705/34 |
| 6,282,573 B1 | 8/2001 | Darago et al. | 709/229 |
| 6,295,447 B1 | 9/2001 | Reichelt et al. | 455/417 |
| 6,480,485 B1 | 11/2002 | Kari et al. | 370/352 |
| 6,516,190 B1 * | 2/2003 | Linkola | 455/408 |
| 6,539,217 B1 * | 3/2003 | Syed et al. | 455/406 |
| 6,611,821 B2 | 8/2003 | Stahl et al. | 705/400 |
| 6,665,537 B1 | 12/2003 | Lioy | 455/435 |
| 6,665,718 B1 * | 12/2003 | Chuah et al. | 709/225 |
| 6,671,675 B2 | 12/2003 | Iwamura | 705/30 |
| 6,728,266 B1 | 4/2004 | Sabry et al. | 370/468 |
| 6,757,371 B2 | 6/2004 | Kim et al. | 379/114.22 |
| 7,529,711 B2 * | 5/2009 | Reith | 705/40 |
| 2001/0023428 A1 | 9/2001 | Miyazaki et al. | 709/201 |
| 2002/0059114 A1 | 5/2002 | Cockrill et al. | 705/27 |
| 2002/0120577 A1 * | 8/2002 | Hans et al. | 705/59 |
| 2002/0138601 A1 | 9/2002 | Piponius et al. | 709/223 |
| 2002/0138617 A1 * | 9/2002 | Christfort et al. | 709/225 |
| 2003/0079013 A1 * | 4/2003 | I'Anson | 709/224 |
| 2003/0114141 A1 * | 6/2003 | Offer | 455/406 |
| 2004/0106393 A1 * | 6/2004 | Chowdhury et al. | 455/406 |
| 2004/0162855 A1 * | 8/2004 | Nagy et al. | 707/104.1 |
| 2004/0203641 A1 * | 10/2004 | Hazlewood | 455/414.1 |
| 2008/0031211 A1 * | 2/2008 | Kalavade et al. | 370/338 |

FOREIGN PATENT DOCUMENTS

| | | |
|---|---|---|
| WO | WO 99/31610 | 6/1999 |

OTHER PUBLICATIONS

Centaur Communications, "Secret Bear platform allows paid-for SMS Annotated Title—Secret Bear introduced cross-network reverse billing platform allowing content providers to charge for SMS content," New Media Age, NDN 173-0354-6130-3, 1 pg, Jun. 28, 2001.

Karsten Lüttge, "E-Charging API: Outsource Charging to a Payment Service Provider," NDN 174-0708-0924-8, pp. 216-227, 2001.

A. Herzberg, "Safeguarding Digital Library Contents: Charging for Online Content," D-Lib Magazine, NDN 174-0590-9051-8, 16 pgs, Jan. 1998.

Business Wire, "Apogee Networks Introduces Industry's First Content Usage-Based Billing Solution for Web Hosters," NDN 219-0281-6988-1, 2 pgs, May 8, 2001.

Business Wire, "Apogee Networks Announces Investment by Cisco Systems; Combined Efforts Enhance Billing Capabilities for Content Delivery Network Providers," NDN 219-0220-9035-0, 2 pgs, Jan. 23, 2001.

Business Wire, "Key Analysts Predict Content Billing is the Internet's New Frontier; Content is the Asset of the Industry; Apogee Networks Seen as the Leader in New Internet Industry Space," NDN 219-0162-6934-6, 3 pgs, Oct. 10, 2000.

Business Wire, "Apogee Networks Unveils NetCountant Wireless Billing At SUPERCOMM; Company Demonstrates Industry First Wireless Content Usage Based Billing Solution," NDN 218-0324-8075-6, 2 pgs, Jun. 5, 2001.

Business Wire, "Apogee Networks Wins 2000 Communications ASP Product of the Year Award; Apogee Networks' NetCountant Billing Takes Top Honors for Innovative Content Usage Based Billing Solutions," NDN 218-0282-3757-7, 2 pgs, Mar. 21, 2001.

Business Wire, "Wireless Internet Content Billing and Settlement Capability Announced; Companies Announce Interoperability Between WAP Gateway and Content Billing System," NDN 218-0220-0997-2, 2 pgs, Dec. 6, 2000.

Business Wire, "Apogee Networks Joins Content Alliance; Billing Expert to Join Industry Group Aimed At Advancing Content Networking," NDN 218-0181-2716-7, 3 pgs, Oct. 11, 2000.

Business Wire, "Apogee Networks, Inc. and Paysys International, Inc. to Integrate Technologies to Create Advanced IP Content Billing Solutions," NDN 218-0098-0623-9, 3 pgs, Jun. 19, 2000.

* cited by examiner

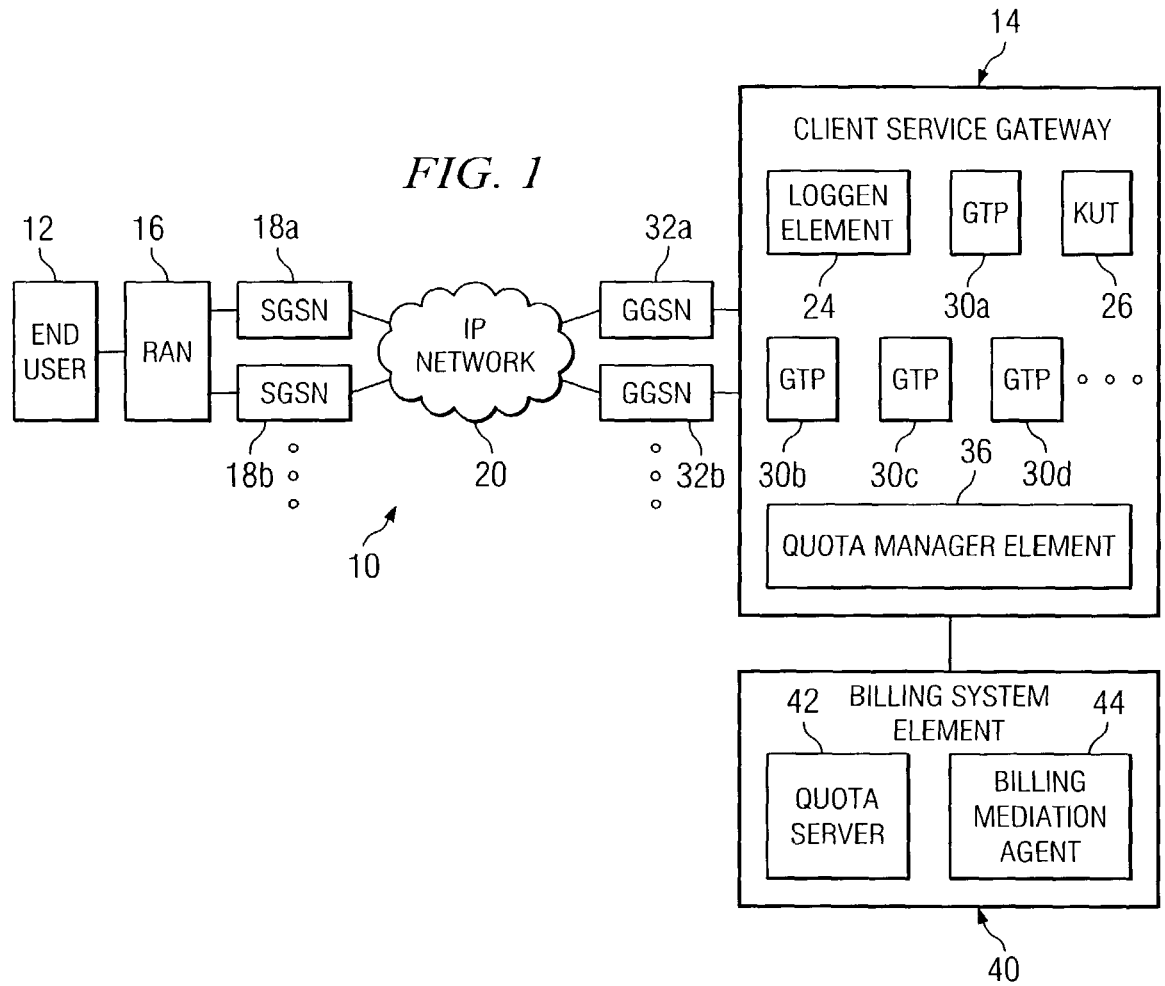

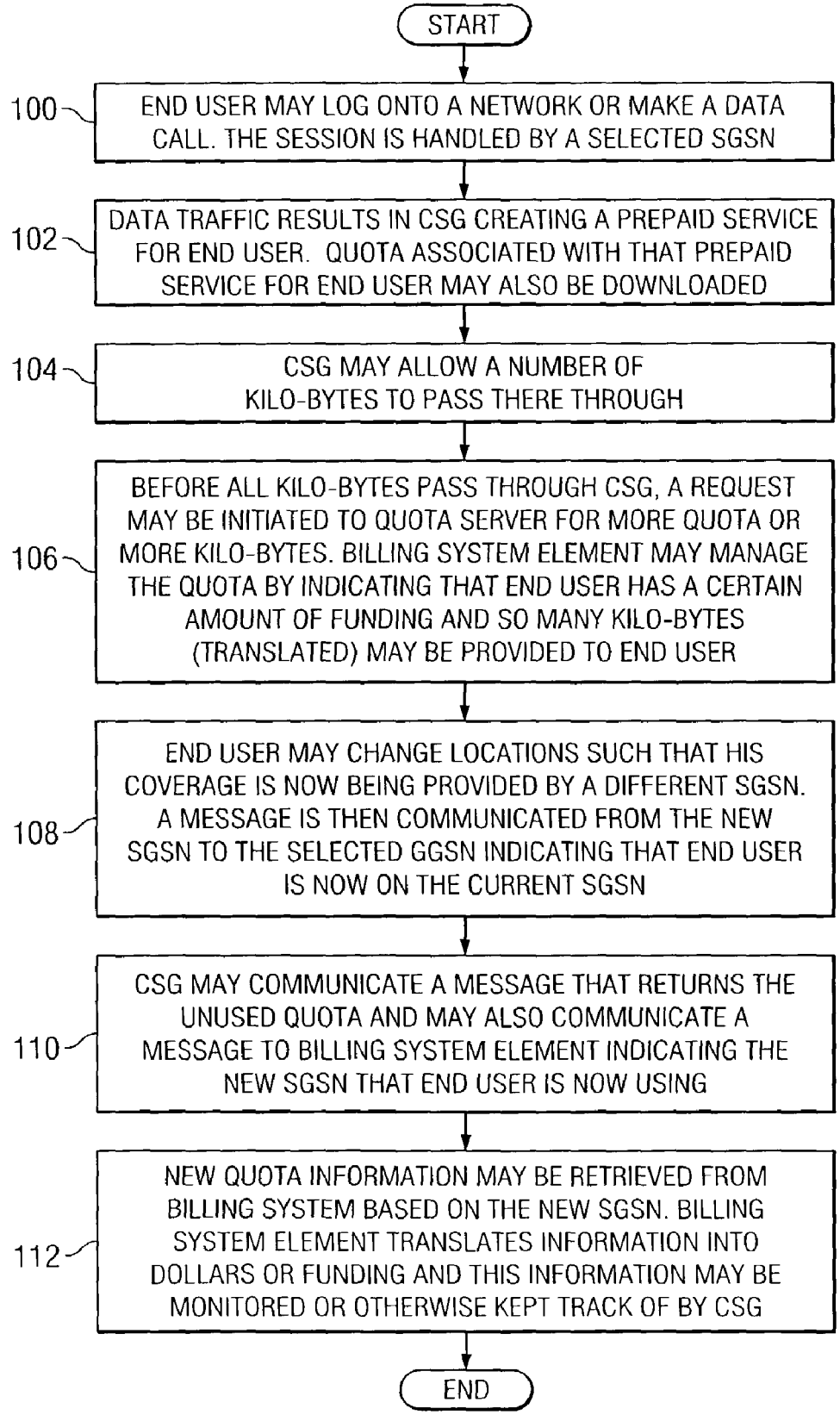

SYSTEM AND METHOD FOR MANAGING NETWORK ACCESS FOR AN END USER

TECHNICAL FIELD OF THE INVENTION

This invention relates in general to the field of communications and more particularly to a system and method for managing network access for an end user.

BACKGROUND OF THE INVENTION

Data networking architectures have grown increasingly complex in communications systems and environments. Communication tunnels or connections may be used in order to establish or to gain access to a network, whereby an end user or an object may initiate a tunneling protocol by invoking a selected location or a network node. The network node or central location may then provide a platform that the end user may use to conduct a communication session. In cases where the end user or object initiating the communication session moves to a new geographic area or a change occurs in any other network parameter, another network node may become involved in the communication session.

As the subscriber base of end users increases and/or becomes mobile, proper routing and efficient management of communication sessions and data flows becomes even more critical. Some communication sessions or tunnels may reflect stagnant information or inaccurate data residing in the network. Inaccurate information may be the result of movement by an entity, a source, or an end user and delays in responding to the transition. The ability to properly and quickly manage accurate information in a network environment presents a significant challenge to system designers and network operators.

SUMMARY OF THE INVENTION

From the foregoing, it may be appreciated by those skilled in the art that a need has arisen for an improved management approach for network access provided to an end user. In accordance with one embodiment of the present invention, a system and method for managing network access for an end user are provided that greatly reduce disadvantages and problems associated with conventional data management techniques.

According to one embodiment of the present invention, there is provided a method for managing network access that includes receiving a signal indicating a change in a network parameter. The change reflects that an end user associated with a communication session has changed from using a first network node to a second network node. Each of the network nodes is operable to facilitate the communication session associated with the end user. The method also includes communicating with a billing system element to notify the billing system element of the change in the network parameter and receiving quota information for the end user associated with the second network node. The billing information associated with the second network node may be applied to the communication session. The billing information is based on the quota information.

Certain embodiments of the present invention may provide a number of technical advantages. For example, according to one embodiment of the present invention a communications approach is provided that allows different tariffs to be used in billing a source, an entity, or an end user as it moves from one location to another. This is because the status of the session, and movement associated therewith, may be signaled to other nodes in the network. This signaling allows other nodes to provide different financial configurations for the session in response to parameter changes such as, for example, movement by an end user or different fee structures being implemented for an end user.

Yet another technical advantage of one embodiment of the present invention is provided by an environment where a user's prepaid quota is being managed on a network device, such as a Content Services Gateway (CSG) for example, which operates to quickly and accurately determine financial parameters or billing rates to be provided to a given end user. The CSG may maintain current quota information for each communication session associated with the end user. By being aware of the end user's movement, the CSG can refresh quota information based on the user's location. This allows the CSG to accurately provide various financial structures for a communication session as an end user moves between nodes in the network. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 1 is a simplified block diagram of a communications system for allocating data in a network environment in accordance with one embodiment of the present invention;

FIG. 2 is a simplified block diagram of a known user table (KUT) included within the communication system; and FIG. 3 is a flowchart illustrating a series of example steps associated with a method for allocating data in a network environment.

DETAILED DESCRIPTION OF THE INVENTION

FIG. 1 is a simplified block diagram of a communication system 10 for allocating data in a network environment. Communication system 10 includes an end user 12, a Content Services Gateway (CSG) 14, a radio access network (RAN) 16, multiple serving general packet radio service (GPRS) support nodes (SGSN) 18a and 18b, and an internet protocol (IP) network 20. Additionally, communication system 10 includes multiple gateway GPRS support nodes (GGSNs) 32a-b. In addition, CSG 14 may include a loggen element 24, a known user table (KUT) 26, multiple GPRS tunneling protocol (GTP) communications protocol elements 30a-d that facilitate communications between CSG 14 and any billing entity within communication system 10, and a quota manager element 36. Communication system 10 may additionally include a billing system element 40 that may include a quota server 42 and a billing mediation agent (BMA) 44.

Communication system 10 may be generally configured or arranged to represent a 2.5 G communication architecture applicable to a Global System for Mobile (GSM) environment in accordance with a particular embodiment of the present invention. Communication system 10 may also be configured to reflect a version of any suitable GPRS tunneling protocol. Communication system 10 may additionally cooperate with 3G architectures that provide some configuration for allocating data in a network environment. Communication system 10 may also be employed in any other suitable communication environment that seeks to allocate or otherwise manage data or information in a network environment.

In accordance with the teachings of the present invention, communication system 10 operates to accurately manage user access in response to a network parameter change, such as end user 12 moving from SGSN 18a to SGSN 18b. The mobility or movement between nodes in communication system 10 may be signaled to CSG 14 in order to assign or designate a different billing policy for end user 12. CSG 14 may invoke billing system element 40 in order to determine how much funding a given end user 12 has been allocated. Based on this information, CSG 14 may then provide for an accurate data allocation associated with a communications flow therethrough until the allotment of information for end user 12 has been exhausted.

Communications system 10 provides a configuration that allows different tariffs to be placed on a source, an entity, or end user 12 as network parameters change. This is because the status of the session, such as the movement associated therewith, is signaled to other nodes in the network. This signaling allows other nodes to provide different billing policies for the session in response to parameter changes, such as geographical location, roaming out of a given network, changes in fee structure based on a designated time interval, shifts in distances between end user 12 and SSGNs 18a-b, or any other suitable parameter associated with end user 12.

Communications system 10 also employs the use of CSG 14 that operates to quickly and accurately determine billing policies to be applied for a given end user 12. CSG 14 may maintain or access current quota information for each communication session associated with end user 12. This allows CSG 14 to apply different billing policies for a communication session as end user 12 experiences some change in parameters reflected by a different fee structure being provided. In a cellular telephone environment, this change may reflect end user 12 roaming to a different area or calling outside a designated area and result in a different fee structure being applied to end user 12 based on his prepaid data allocation agreement.

End user 12 is a client, customer, entity, source, or object seeking to initiate a communication tunnel in communication system 10 via IP network 20. End user 12 may be inclusive of devices used to initiate a communication, such as a computer, a personal digital assistant (PDA), a laptop or an electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, video, graphic, or script data, or any type of source or object code, or any other suitable information in any appropriate format that may be communicated from one point to another.

RAN 16 is a communications interface between end user 12 and SGSNs 18a and 18b. RAN 16 may comprise a base transceiver station and a base station controller in one embodiment. The communications interface provided by RAN 16 may allow data to be exchanged between end user 12 and any number of selected elements within communication system 10. RAN 16 may facilitate the delivery of a request packet generated by end user 12 and the reception of information sought by end user 12. RAN 16 is only one example of a communications interface between end user 12 and SGSNs 18a and 18b. Other suitable types of communications interfaces may be used for any particular network design and be based on specific communications architectures in accordance with particular needs.

SGSNs 18a and 18b and GGSNs 32a and 32b are communications interfaces or nodes that cooperate in order to facilitate a communication session involving end user 12. GGSNs 32a-b are communications nodes operating in a GPRS environment that may be working in conjunction with multiple SGSNs 18a and 18b to provide a communications medium in a GPRS service network for communicating data exchanges within communication system 10. GGSNs 32a and 32b may be inclusive of a walled garden (providing a security or an access functionality to communication system 10) or any other suitable mechanism that a network operator may choose to implement in providing some connectivity for a network. GPRS represents a packet-based data bearer service for communication services that may be delivered as a network overlay for any type of suitable network configuration or platform. GPRS may support multiple internet communication protocols and may enable existing IP, point to point protocol (PPP), or any other suitable applications or platforms to operate over a network.

When end user 12 changes between SGSN 18a and 18b, the change may be communicated to CSG 14 by any appropriate node such as a selected GGSN 32a or 32b. This could be effectuated by a remote access dial-in user service (RADIUS) accounting message via a start signal or an interim update signal. This could also be reflected in a vendor-specific attribute that indicates the new SGSN being different from the current SGSN being used by end user 12. That message may also be communicated to billing system element 40 indicating the change in SGSN. The change in SGSN may result in quota data being returned to billing system element 40 for this particular data such as, for example, prepaid content. Pricing may vary for prepaid content depending on the geographic position of end user 12, roaming off network, or which SGSN is currently being implemented. Additionally, for example, pricing may also be different based on a given fee structure such as pricing per download, pricing per byte, or pricing for a selected time interval. Alternatively, any other parameter may be used in order to vary billing rates provided for a given end user 12. A selected GGSN 32a or 32b may report the change in SGSN by end user 12 via RADIUS messaging. Alternatively, this signaling may be provided by any data exchange or architected in any suitable communication standard or protocol in accordance with particular needs.

IP network 20 represents a series of points or nodes of interconnected communication paths for receiving and transmitting packets of information that propagate through communication system 10. IP network 20 offers a communicative interface between end user 12 and selected GGSNs 32a-b and may be any local area network (LAN), wireless local area network (WLAN), metropolitan area network (MAN), wide area network (WAN), or any other appropriate architecture or system that facilitates communications in a network environment. IP network 20 may implement a user datagram protocol (UDP)/internet protocol (UDP/IP) connection and use a transmission control protocol (TCP/IP) communication language protocol in particular embodiments of the present invention. However, IP network 20 may alternatively implement any other suitable communication protocol for transmitting and receiving data packets within communication system 10.

CSG 14 is a network element that may be inserted into a data flow that may view, extract, identify, access, or otherwise monitor information included within the data flow. In an example embodiment, CSG 14 may extract IP source address information associated with end user 12. The IP source address may be used to determine an identity of end user 12 that may be stored in KUT 26. Alternatively, CSG 14 may extract or identify any information within the data flow, that provides a correlation between end user 12 and a given data flow. CSG 14 may also be a client-aware device that provides or offers some service or feature to end user 12. Such services may be based on an effective mapping between a source IP address of a given address packet and a user profile or information associated with end user 12. CSG 14 may utilize a source IP address in providing services or features to end user 12. CSG 14 may include a RADIUS component that may receive RADIUS updates and parse the updates. In addition, CSG 14 may execute some action based on the RADIUS updates it receives. CSG 14 may be provided with accounting, authorization and authentication (AAA) capabilities where appropriate. Alternatively, these capabilities may be provided external to CSG 14, for example, in a AAA server.

There are a number of additional reasons why a device or a component may seek to identify the source (end user 12) associated with a communication session or data flow. For example, some devices may wish to identify end user 12 for authorization purposes. In another example, a device may wish to maintain user profiles for billing or accounting records (for example, in conjunction with per-user accounting) or to provide for content billing information. Alternatively, a device or a component may use the identification of end user 12 to provide for any other type of suitable client-aware service, tool, or feature according to the particular needs of network operators. Additional services may be related to areas such as routing, permissions or access granting mechanisms, priority, quality of service (QoS), firewalling, content filtering, or any other suitable parameters or policies where user-aware characteristics serve as a basis for the network service implementation.

CSG 14 may allow content level billing granularity in a service provider network. The location of end user 12 may be one parameter used in determining a billing policy for end user 12. As end user 12 moves from one location to another, the associated billing rate may vary. As end user 12 migrates from one geographic location (or coverage area) to another, different billing rates may be applied for the traffic or session. For example, in the GPRS network offered for purposes of example, end user 12 may move from SGSN 18*a* to SGSN 18*b* and thereby incur different roaming charges. Alternatively, roaming by end user 12 may result in being positioned in a region within the boundaries of an operator's network where billing rates are different from the current billing rate being applied. In the case of prepaid services or prepaid content, CSG 14 may execute quota enforcement. Quota may represent a unit-dependent reservation element to be provided for selected end users or end users that are part of a particular service plan. For example, if a given service provider is billing by volume, the quota may be expressed in units of bytes (e.g. IP bytes). Thus, for example, a byte quota from billing system 40 may indicate for end user 12 that he is being offered a reservation of 128 kilo-bytes. It may not be sufficient to simply allow billing system element 40 to be aware of a given change because the quota reservation unit or value that may have been downloaded prior to the location change by end user 12 may need to be refreshed. The refreshed quota value reflects the most current quota information associated with end user 12.

In an example scenario, end user 12 may have a communication session established with SGSN 18*a* where a certain amount of money from an account of end user 12 is translated into a download of a given number of bytes. When end user 12 moves to SGSN 18*b*, end user 12 may be permitted to download a different number of designated bytes for the same amount of money or billing rate. The SGSN change may be detected by GGSN 32*a* or 32*b* whereby the selected GGSN communicates an accounting update to CSG 14. CSG 14 may then return all downloaded quota for end user 12 and notify billing system 40 of the change in SGSN. CSG 14 may also communicate an acknowledgement to the selected GGSN for the message provided thereto. CSG 14 may then download the appropriate quota information for end user 12 again. This information may be retrieved from quota server 42 or alternatively from any other suitable database or storage element provided within billing system element 40 or provided external thereto. Billing system 40 may be aware of the location change and send quota information to CSG 14 based on new financial parameters or new tariff characteristics that apply to the new location or the change in network parameters.

Loggen element 24 is a storage element operable to build billing records and communicate the billing records to BMA 44 based on information provided by KUT 26. Even in cases where the information returned by KUT 26 reflects a null (e.g., no active BMA), this may be communicated to GTP element 30*a*, which may use the value to determine the destination and queue(s) to use or to invoke for a corresponding billing record. Loggen element 24 may also operate to store data for later use and execute all formatting for billing records to be communicated to BMA 44. Loggen element 24 may be implemented using hardware, software, or any other suitable element or object operable to store information and to generate a billing record to be communicated to BMA 44. Loggen element 24 may communicate with BMA 44 in order to log quota usage data associated with end user 12. Loggen element 24 may generate logging records or billing records and additionally send messages to billing system 40 associated with a change in SGSN.

KUT 26 is a data storage element that manages one or more correlations between the ID of end user 12 and a corresponding IP address. KUT 26 may also store information relating to BMA 44, previously designated to end user 12, and BMA 44 may be invoked when additional information associated with end user 12 is communicated to CSG 14. KUT 26 may be consulted as additional billing records are created in order to determine that BMA 44 should receive selected billing records. KUT 26 may also include an application program interface (API) that may be implemented in order to obtain user ID information for an IP address from a data flow.

CSG 14 and billing system element 40 may implement any suitable communications protocol in order to exchange information. In an example embodiment, GTP elements 30*a-d* may be used as a communications protocol or platform for such communications. Alternatively, CSG 14 and billing system element 40 (or BMA 44) may implement any communications protocol or tunneling communication link in order to provide for a suitable data exchange. GTP elements 30*a-d* may be included in CSG 14 or provided external thereto and be GTP or non-GTP based where appropriate. In one embodiment, GTP elements 30*a-d* are software communication protocols that describe the acknowledgement (or ACKing) and handshaking operations that may allow recognition of active, operational, and disabled states associated with BMA 44. In addition, GTP elements 30a-d may facilitate the formatting, header information, sequencing, and other communication parameters in order to effectively deliver data or information between CSG 14 and BMA 44.

In operation of an example embodiment, a packet may be delivered to CSG 14. The first packet in the data flow may be associated with end user 12 and analyzed by CSG 14. CSG 14 may operate to save selected data and (depending on whether it is a hypertext tunneling protocol (HTTP) request or a non-HTTP request) suitably discard other information. In the case where the data flow does not include an HTTP request, CSG 14 may simply retain certain information about the data flow and potentially save that information until the flow ends. Where an HTTP request is made, information may exist that is provided by a browser and additional information may be offered about the URL which may be used by CSG 14. In addition, information about which location in the network end user 12 is attempting to access may also be used by CSG 14. CSG 14 may perform a sniffing operation in this sense and glean information from packets included within a data flow. Other information to be extracted from HTTP requests or non-HTTP requests may include source and destination address information, how long the communication session lasted, how many bytes were sent or received by end user 12, or any other suitable parameters or properties associated with end user 12, the location to be accessed, or the data flow initiated by end user 12.

A billing record may then be created within CSG 14 and sent to BMA 44. A look-up operation may then be performed in order to correlate the IP address of end user 12 in KUT 26 to the user ID that may be included in that billing record. With this information provided, BMA 44 may now be assigned for this end user (if end user 12 is a new user). If this information or data flow is associated with an existing end user 12, it may be determined that BMA 44 was previously being used by end user 12.

Quota manager element 36 is an element that allocates quota information associated with end user 12. Quota manager element 36 also provides an interface between GGSNs 32a and 32b and billing system element 40 and may receive a communication that indicates a change in SGSN. Quota manager element 36 may also identify new and old identifiers or pointers for selected SGSNs involved in the communication session and notify billing system element 40. Quota manager element 36 may also communicate with billing system 40 in order to exchange information associated with funding for end user 12. Quota manager element 36 may also receive RADIUS updates from GGSN 32a or 32b that reflect the current status associated with end user 12.

Billing system element 40 is an object that manages the financial information or funding characteristics associated with a given end user 12. CSG 14 may communicate with billing system 40 in order to retrieve information or learn of financial configurations to be provided to end user 12. Billing system element 40 may include quota server 42 and/or BMA 44 in order to effectuate these operations and facilitate communications between billing system 40 and CSG 14.

In operation, BMA 44 may send information updates at the beginning and end of communication sessions. In the information updates, byte counts and visited locations that were accessed by end user 12 may be provided. Alternatively, BMA 44 may include any other appropriate information or data in the updates in accordance with particular needs. Quota server 42 may operate to provide the funding for end user 12 and in certain embodiments may be user-aware and be involved in the flow of information in real-time where appropriate. Quota server 42 may also indicate whether a given end user 12 no longer has funding or is otherwise not authorized to access certain information.

CSG 14 and billing system element 40 may include any suitable hardware, software, objects, or elements capable of effectuating its operations or the operations of the elements included therein. Additionally, any one or more of the elements included in CSG 14 and billing system 40 may be provided in an external structure or combined where appropriate. Moreover, any of the functions provided by these two elements may be offered in a single unit or arbitrarily swapped between CSG 14 and billing system element 40. The embodiment offered in FIG. 1 has been provided for purposes of example only. The arrangement of elements (and their associated operation(s)) may be reconfigured significantly in any other appropriate manner in accordance with the teachings of the present invention.

FIG. 2 is a simplified block diagram of KUT 26 included within communication system 10 in accordance with one embodiment of the present invention. KUT 26 may operate to manage or correlate user ID information with IP address data from a given communication or data flow. A number of entries may be included within KUT 26 that execute this correlation. For example, an entry may be provided as key address '1.1.1.1' with a data field in a first segment that defines BMA 44 (data field #1) and a data field in a second segment that identifies a user ID for that IP address as some person or entity (data field #2). This is illustrated by the 'John Smith' entry in FIG. 2.

KUT 26 may also identify or store current SGSN information (data field #3) for end user 12 in a third segment. KUT 26 may receive RADIUS updates and maintain an end user's IP address and new SGSN that is being used. KUT 26 may be accessed in order to indicate that end user 12 has an IP address of 1.1.1.1. Such an address may correspond to 'John Smith' and an identifier of SGSN #1 (e.g. its IP address) or that 'John Smith' is now engaging SGSN #2 (reflected by its identifier, e.g. its IP address). KUT 26 has the capability of recognizing old and new SGSNs and may further add a capability to recognize changes therewith.

In operation, KUT 26 may return a given BMA 44 to use as the destination for all billing records for a particular session, data flow, or end user 12 in accordance with one or more of the following example guidelines. If an element with an already known user ID exists in KUT 26 and corresponds to any requested IP address, the identification (IP address) of the selected BMA 44 may be forwarded from KUT 26 to the caller entity. Where requested elements with user IDs exist, the selected BMA 44 for a first IP request may be returned.

If no IP address has a corresponding element in KUT 26, KUT 26 may notify loggen element 24 that no user ID is present in the table. When loggen element 24 determines that no user ID information will be obtained, it may communicate with KUT 26 and deliver source and destination IP addresses in order to assign BMA 44. KUT 26 may also operate to accurately recall the IP address associated with an identification correlating to end user 12. In an example scenario, CSG 14 may not know the identity of end user 12 and therefore an IP source address or some other user-identifying data is needed. The IP address may be dynamically assigned when an associated device is activated, e.g., a cellular telephone is turned on. The IP address may be assigned by any suitable element such as GGSNs 32a or 32b for example. Alternatively, an IP source address may be assigned or designated in any other suitable manner. KUT 26 may now be implemented to retrieve the user ID name associated with the IP address correlating to end user 12. This information may be positioned in a billing record that may be used to create a bill for a given end user 12. This may also be used (for example) to track information such as how many bytes were uploaded by end user 12 (byte counts) or how many uniform resource locator (URL) addresses were accessed (or which URL addresses were accessed) by a given end user 12.

KUT 26 is thus provided with the capability of mapping the source IP address (or any other end user 12 parameter) to a user ID. The user ID may be obtained from an external database where appropriate or any other suitable location. Alternatively, the user ID may be extracted from a RADIUS flow, a terminal access controller access control system (TACACS) communications flow, a diameter communications flow, or any other suitable communications protocol flow, communication session, or data exchange. The database may be populated at any suitable time and updated using any suitable mechanism, such as via sniffing of RADIUS or TACACS flows.

FIG. 3 is a flowchart illustrating a series of example steps associated with a method for allocating data in communication system 10. The method begins at step 100 where end user 12 may log onto a network or make a data call. The session is handled by a selected SGSN 18a or 18b. For purposes of this example, SGSN 18a is selected and it establishes a tunnel or connection to a given GGSN 32a or 32b. The selected GGSN 32a or 32b may communicate a RADIUS Accounting-Start message to CSG 14. One vendor-specific attribute included in the Accounting-Start message may be the IP address of SGSN 18a. CSG 14 may respond by ACKing the Accounting-Start message back to the selected GGSN 32a or 32b. End user 12 may then start data traffic.

At step 102, data traffic results in CSG 14 creating a prepaid service for end user 12. Quota associated with that prepaid service for end user 12 may also be downloaded. At step 104, CSG 14 may allow (in an example scenario) 128 kilobytes to pass therethrough. Potentially before all 128 kilobytes pass through CSG 14, a request may be initiated to quota server 42 for more quota or more kilo-bytes at step 106. Billing system element 40 may manage the quota by indicating that end user 12 has a certain amount of funding and so many kilo-bytes (translated) may be provided to end user 12. CSG 14 may thus limit end user 12 to the assigned amount of traffic or allow a specific number of uniform resource locator (URL) clicks.

At step 108, end user 12 may change locations such that his coverage is now being provided by SGSN 18b. A message is then communicated from the new SGSN 18b to a selected GGSN 32a or 32b indicating that end user 12 is now on the current SGSN. This message may indicate, for example, an SGSN IP address or alternatively any other suitable identifier. GGSN 32a or 32b may then communicate a message (e.g. RADIUS accounting message) to CSG 14. The selected GGSN may know or be aware of the SGSN switch and communicate this information to CSG 14.

CSG 14 may see the vendor-specific attribute indicating a new SGSN IP address and may also identify any current balance of unused quota from billing system element 40. At step 110, CSG 14 may communicate a message that returns the unused quota and may also communicate a message to billing system element 40 indicating the new SGSN that end user 12 is now using.

At step 112, new quota information may be retrieved from billing system 40 based on the new SGSN. Thus, a new tariff may be assigned for end user 12 based on his new SGSN, new location, or new situation. Billing system element 40 may continue translating information into dollars or funding and this information may be monitored or otherwise kept track of by CSG 14.

Some of the steps illustrated in FIG. 3 may be changed or deleted where appropriate and additional steps may also be added to the flowchart. These changes may be based on specific communication architectures or particular interfacing arrangements and configurations of associated elements and do not depart from the scope or the teachings of the present invention.

Although the present invention has been described in detail with reference to particular embodiments, communication system 10 may be extended to any scenario in which end user 12 is provided with mobility in the context of a wired or a wireless connection or coupling. This may also be extended to any other network parameter changes and include communications with some type of access server (e.g. a network access server (NAS), foreign agents, etc.). End user 12 may use a dedicated connection of some form or use forms of multiple access protocols where appropriate. Access may be associated with a PPP architecture or alternatively with layer three protocols over a layer two in accordance with particular needs. Moreover, significant flexibility is provided by communication system 10 in that any suitable one or more components may be replaced with other components that facilitate their operations. For example, RAN 16 and SGSNs 18a and 18b may be replaced by an access network or by a packet data serving node (PDSN). Additionally, GGSNs 32a and 32b may be replaced by a home agent or a NAS where appropriate.

Additionally, although communication system 10 has been described with reference to a number of elements included within CSG 14, these elements may be rearranged or positioned anywhere within communication system 10. In addition, these elements may be provided as separate external components to communication system 10 where appropriate. The present invention contemplates great flexibility in the arrangement of these elements as well as their internal components. For example, in an alternative embodiment CSG 14 may include billing system element 40 or BMA 44 or these elements may be provided in a single module.

Moreover, although FIGS. 1 and 2 illustrate an arrangement of selected elements, such as CSG 14 inclusive of quota manager element 36, loggen element 24, or GTP elements 30a-d, numerous other components may be used in combination with these elements or substituted for these elements without departing from the teachings of the present invention. Additionally, CSG 14 may be positioned in any suitable point of a data flow such that it may extract information used for generating a billing record.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:
1. An apparatus for managing network access, comprising:
a Content Services Gateway comprising:
one or more processing modules operable to:
facilitate a communication session for an end user at a first location, the communication session using a first network node servicing the first location, the end user associated with a quota based on a first tariff associated with the first location;
receive a signal indicating a change in a network parameter, the change reflecting that the end user has moved from the first location to a second location and changed from using the first network node to a second network node servicing the second location;
notify a billing system element of the change in the network parameter indicating movement;
receive quota information indicating the quota based on a second tariff associated with the second location; and
provide a quota enforcement mechanism such that content being delivered to the end user is limited according to the quota based on the second tariff associated with the second location;
one or more memory modules operable to store a known user table (KUT), the KUT including:
an internet protocol (IP) address associated with the end user; and
information associated with the first and second network nodes being used by the end user.

2. The apparatus of claim 1, wherein the Content Services Gateway further comprises one or more general packet radio system (GPRS) tunneling protocol (GTP) based communication protocol elements operable to facilitate communications between the Content Services Gateway and the billing system element.

3. The apparatus of claim 1, wherein the Content Services Gateway includes a loggen element operable to generate a billing record associated with the end user and to communicate the change in the network parameter to the billing system element, and wherein the loggen element communicates with a billing mediation agent included in the billing system element.

4. The apparatus of claim 1, wherein the billing system further comprises a quota server operable to store quota data for the end user that reflects an allotment of information to be provided to the end user, the quota server operable to be updated in accordance with direction provided by the Content Services Gateway.

5. The apparatus of claim 1, wherein the Content Services Gateway further comprises a quota manager element operable to receive identifiers associated with the first and second network nodes and to notify the billing system element of the change from the first network node to the second network node.

6. The apparatus of claim 1, wherein the billing system element includes a billing mediation agent operable to generate a billing record associated with the end user.

7. The apparatus of claim 1, wherein the change results in a different fee structure being applied to information being delivered to the end user.

8. A method for managing network access, comprising:
facilitating a communication session for an end user at a first location, the communication session using a first network node servicing the first location, the end user associated with a quota based on a first tariff associated with the first location;
receiving a signal indicating a change in a network parameter, the change reflecting that the has moved from the first location to a second location and changed from using the first network node to a second network node servicing the second location;
notifying a billing system element of the change in the network parameter indicating movement;
receiving quota information indicating the quota based on a second tariff associated with the second location;
applying billing information associated with the second network node to the communication session, the billing information being based on the quota information;
providing a quota enforcement mechanism such that content being delivered to the end user is limited according to the quota based on the second tariff associated with the second location;
storing, in a known user table (KUT), information associated with the first and second network nodes being used by the end user; and
storing, in the KUT, an internet protocol (IP) address associated with the end user, the IP address identifying the end user in order to facilitate the application of the billing information.

9. The method of claim 8, further comprising generating a billing record associated with the end user that reflects the billing information being applied.

10. The method of claim 8, further comprising storing quota data for the end user that reflects an allotment of information to be provided to the end user.

11. The method of claim 8, further comprising:
receiving identifiers associated with the first and second network nodes; and
notifying the billing system element of the change from the first network node to the second network node.

12. The method of claim 8, wherein the change results in a different fee structure being applied to information being delivered to the end user.

13. A system for managing network access, comprising:
means for facilitating a communication session for an end user at a first location, the communication session using a first network node servicing the first location, the end user associated with a quota based on a first tariff associated with the first location;
means for receiving a signal indicating a change in a network parameter, the change reflecting that the end user has moved from the first location to a second location and changed from using the first network node to a second network node servicing the second location;
means for notifying a billing system element of the change in the network parameter indicating movement;
means for receiving quota information indicating the quota based on a second tariff associated with the second location;
means for applying billing information associated with the second network node to the communication session, the billing information being based on the quota information;
means for providing a quota enforcement mechanism such that content being delivered to the end user is limited according to the quota based on the second tariff associated with the second location;
means for storing, in a known user table (KUT), information associated with the first and second network nodes being used by the end user; and
means for storing, in the KUT, an internet protocol (IP) address associated with the end user, the IP address identifying the end user in order to facilitate the application of the billing information.

14. The system of claim 13, further comprising means for generating a billing record associated with the end user that reflects the billing information being applied.

15. The system of claim 13, further comprising means for storing quota data for the end user that reflects an allotment of information to be provided to the end user.

16. The system of claim 13, further comprising:
means for receiving identifiers associated with the first and second network nodes; and
means for notifying the billing system element of the change from the first network node to the second network node.

17. The system of claim 13, wherein the change results in a different fee structure being applied to information being delivered to the end user.

18. A non-transitory computer readable medium including code for managing network access, the code operable to:
facilitate a communication session for an end user at a first location, the communication session using a first network node servicing the first location, the end user associated with a quota based on a first tariff associated with the first location;
receive a signal indicating a change in a network parameter, the change reflecting that the end user has moved from the first location to a second location and changed from using the first network node to a second network node servicing the second location;
notify a billing system element of the change in the network parameter indicating movement;
receive quota information indicating the quota based on a second tariff associated with the second location;
apply billing information associated with the second network node to the communication session, the billing information being based on the quota information; and
provide a quota enforcement mechanism such that content being delivered to the end user is limited according to the quota based on the second tariff associated with the second location;
store, in a known user table (KUT), information associated with the first and second network nodes being used by the end user; and
store, in the KUT, an internet protocol (IP) address associated with the end user, the IP address identifying the end user in order to facilitate the application of the billing information.

19. The non-transitory computer readable medium of claim 18, wherein the code is further operable to:
generate a billing record associated with the end user that reflects the billing information being applied.

20. The non-transitory computer readable medium of claim 18, wherein the code is further operable to:
store quota data for the end user that reflects an allotment of information to be provided to the end user.

21. The non-transitory computer readable medium of claim 18, wherein the code is further operable to:
receive identifiers associated with the first and second network nodes; and
notify the billing system element of the change from the first network node to the second network node.

22. The non-transitory computer readable medium of claim 18, wherein the change results in a different fee structure being applied to information being delivered to the end user.

* * * * *